United States Patent
Crable

(10) Patent No.: US 10,255,245 B1
(45) Date of Patent: Apr. 9, 2019

(54) OPTIMIZING RESPONSE CREATION AND DELIVERY FOR LENDING QUERIES

(71) Applicant: Capital One Services, LLC, McLean, VA (US)

(72) Inventor: Fredrick Allen Crable, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/991,719

(22) Filed: May 29, 2018

(51) Int. Cl.
*G06F 16/90* (2019.01)
*G06F 16/903* (2019.01)
*G06F 17/11* (2006.01)
*G06F 16/9038* (2019.01)
*G06Q 40/02* (2012.01)

(52) U.S. Cl.
CPC .... *G06F 16/90335* (2019.01); *G06F 16/9038* (2019.01); *G06F 17/11* (2013.01); *G06Q 40/025* (2013.01)

(58) Field of Classification Search
None
See application file for complete search history.

(56) References Cited

U.S. PATENT DOCUMENTS

| | | | |
|---|---|---|---|
| 8,996,391 B2* | 3/2015 | Stibel | G06F 17/30386 705/1.1 |
| 2008/0263023 A1* | 10/2008 | Vailaya | G06F 17/30675 |
| 2010/0056944 A1* | 3/2010 | Keith | A61B 5/015 600/549 |
| 2016/0335695 A1* | 11/2016 | Gokhale | G06Q 30/0627 |

* cited by examiner

*Primary Examiner* — Jau Shya Meng
(74) *Attorney, Agent, or Firm* — DLA Piper LLP US

(57) ABSTRACT

A search request may define a minimum value and a maximum value for a numerical parameter of the search. A plurality of binary searches may identify a minimum entry and a maximum entry, each binary search comprising selecting a single entry and using at least one analytical model to generate a score for the single entry, wherein the score of the minimum entry corresponds with the minimum value and the score of the maximum entry corresponds with the maximum value. The at least one analytical model may be used to generate a score for each of a set of entries between the minimum entry and the maximum entry while ignoring entries outside of the set of entries between the minimum entry and the maximum entry. Entries responsive to the request may be identified within the scored set of entries.

20 Claims, 5 Drawing Sheets

OPTIMIZING RESPONSE CREATION AND DELIVERY FOR LENDING QUERIES

BACKGROUND

In some cases, searching data requires inputs more complicated than a simple keyword search. For example, when searching items for sale, it may be necessary to consider not only the characteristics of the item, but also price and, in some cases, a transaction structure (e.g., loan terms). Complicated searches with many negotiable parameters may require computationally intensive processing involving heavy brute-force iteration over multiple data sets, making real-time or near real-time results difficult to obtain.

SUMMARY OF THE DISCLOSURE

Systems and methods described herein may improve search processing to return results faster and improve computational efficiency for obtaining results. The systems and methods described herein may streamline processing such that relatively few brute force processes may be performed to arrive at a focused and accurate result.

For example, a method of searching data stored in computer-readable media may include receiving, at a processor, a request to perform a search of a data set comprising a plurality of entries. The request may define a minimum value and a maximum value for a recurring payment. The method may include performing, by the processor, a plurality of binary searches to identify a minimum entry and a maximum entry. Each binary search may include selecting a single entry and using at least one analytical model to generate a score for the single entry. The score of the minimum entry may correspond with the minimum value, and the score of the maximum entry may correspond with the maximum value. The at least one analytical model may be configured to evaluate at least one factor contributing to a recurring payment value. The method may include identifying, by the processor, a set of entries between the minimum entry and the maximum entry. The method may include using the at least one analytical model to generate, by the processor, a score for each of the set of entries between the minimum entry and the maximum entry while ignoring entries outside of the set of entries between the minimum entry and the maximum entry. The method may include identifying, by the processor, at least one of the minimum entry, the maximum entry, and at least one of the scored set of entries between the minimum entry and the maximum entry as a responsive entry based on the respective scores of each of the at least one of the minimum entry, the maximum entry, and at least one of the scored set of entries between the minimum entry and the maximum entry. The method may include returning, by the processor, the at least one responsive entry as a response to the request.

In some embodiments, the method may include storing, by the processor, the respective scores of each of the at least one of the minimum entry, the maximum entry, and at least one of the scored set of entries between the minimum entry and the maximum entry in a memory in communication with the processor.

In some embodiments, the generating of at least one of the scores for the minimum entry, the maximum entry, and at least one of the set plurality of entries may include retrieving a previously determined score of at least one of the minimum entry, the maximum entry, and at least one of the scored set of entries between the minimum entry and the maximum entry from a memory in communication with the processor.

In some embodiments, the recurring payment may be a payment for an item type, and each of the plurality of entries may include data describing an item of the item type. In some embodiments, the generating of at least one of the scores for the minimum entry, the maximum entry, and at least one of the scored set of entries may include applying the at least one analytical model to a price of the at least one item of the at least one of the minimum entry, the maximum entry, and at least one of the scored set of entries. In some embodiments, the generating of at least one of the scores for the minimum entry, the maximum entry, and at least one of the scored set of entries may include applying the at least one analytical model to a quality of the at least one item of the at least one of the minimum entry, the maximum entry, and at least one of the scored set of entries.

In some embodiments, performing the plurality of binary searches may include selecting a first entry ordered in approximately a center of the data set and generating the score for the selected first entry. The method may include iteratively selecting additional entries ordered in approximately a center point between a previously selected entry and a boundary of the data set and generating the score for the selected additional entry until the generated score corresponds with the minimum value. The previously selected entry may be the first entry in a first iteration.

In some embodiments, performing the plurality of binary searches may include selecting a first entry ordered in approximately a center of the data set and generating the score for the selected first entry. The method may include iteratively selecting additional entries ordered in approximately a center point between a previously selected entry and a boundary of the data set and generating the score for the selected additional entry until the generated score corresponds with the maximum value. The previously selected entry may be the first entry in a first iteration.

In another example, a method of responding to search requests using pre-analyzed data may include identifying, by a processor, a set of entries of a data set comprising a plurality of entries. The set of entries may be ordered between a minimum entry and a maximum entry. The method may include using at least one analytical model to generate, by the processor, a score for each of the set of entries between the minimum entry and the maximum entry while ignoring entries outside of the plurality of entries between the minimum entry and the maximum entry. The at least one analytical model may be configured to evaluate at least one factor contributing to a recurring payment value. The method may include storing, by the processor, each score in a memory in communication with the processor. The method may include receiving, at the processor, a request to perform a search of the data set. The request may define a minimum value and a maximum value for a recurring payment. The method may include identifying, by the processor, at least a subset of the set of entries having scores between the minimum value and the maximum value. The method may include returning, by the processor, the at least the subset of the set of entries as at least a portion of the response to the request.

In some embodiments, the method may include determining, by the processor, that at least one responsive entry is likely to exist outside of the set of entries and between the minimum value and the maximum value. The method may include performing, by the processor, a plurality of binary searches to identify an upper bound and a lower bound for the at least one responsive entry. Each binary search may include selecting a single entry and using the at least one analytical model to generate a score for the single entry. The method may include identifying, by the processor, a set of entries between the upper bound and a lower bound. The method may include using the at least one analytical model to generate, by the processor, a score for each of the set of entries between the upper bound and the lower bound while ignoring entries outside of the set of entries between the upper bound and a lower bound. The method may include identifying, by the processor, at least one of the set of entries between the upper bound and the lower bound as a responsive entry based on the respective scores of each of the scored set of entries between the upper bound and the lower bound. The method may include returning, by the processor, the at least one responsive entry as an additional portion of the response to the request.

In some embodiments, the method may include storing, by the processor, the respective scores of each of the set of entries between the upper bound and the lower bound in the memory in communication with the processor.

In some embodiments, performing the plurality of binary searches may include selecting a first entry ordered in approximately a center of the data set and generating the score for the selected first entry. The method may include iteratively selecting additional entries ordered in approximately a center point between a previously selected entry and a boundary of the data set and generating the score for the selected additional entry until the generated score corresponds with the lower bound. The previously selected entry may be the first entry in a first iteration.

In some embodiments, performing the plurality of binary searches may include selecting a first entry ordered in approximately a center of the data set and generating the score for the selected first entry. The method may include iteratively selecting additional entries ordered in approximately a center point between a previously selected entry and a boundary of the data set and generating the score for the selected additional entry until the generated score corresponds with the upper bound. The previously selected entry may be the first entry in a first iteration.

In another example, a system for searching data stored in computer-readable media may include a processor, an interface component in communication with the processor, and a non-transitory memory in communication with the processor. The interface component may be configured to receive a request to perform a search of a data set comprising a plurality of entries, the request defining a minimum value and a maximum value for a recurring payment. The non-transitory memory may include instructions that, when executed by the processor, cause the processor to perform processing. The processing may include performing a plurality of binary searches to identify a minimum entry and a maximum entry. Each binary search may include selecting a single entry and using at least one analytical model to generate a score for the single entry. The score of the minimum entry may correspond with the minimum value, and the score of the maximum entry may correspond with the maximum value. The at least one analytical model may be configured to evaluate at least one factor contributing to a recurring payment value. The processing may include identifying a set of entries between the minimum entry and the maximum entry. The processing may include using the at least one analytical model to generate a score for each of the set of entries between the minimum entry and the maximum entry while ignoring entries outside of the set of entries between the minimum entry and the maximum entry.

The processing may include identifying at least one of the minimum entry, the maximum entry, and at least one of the scored set of entries between the minimum entry and the maximum entry as a responsive entry based on the respective scores of each of the at least one of the minimum entry, the maximum entry, and at least one of the scored set of entries between the minimum entry and the maximum entry. The processing may include returning, by the interface component, the at least one responsive entry as a response to the request.

In some embodiments, the processing may include storing, in the memory, the respective scores of each of the at least one of the minimum entry, the maximum entry, and at least one of the scored set of entries between the minimum entry and the maximum entry.

In some embodiments, the generating of at least one of the scores for the minimum entry, the maximum entry, and at least one of the set plurality of entries may include retrieving a previously determined score of at least one of the minimum entry, the maximum entry, and at least one of the scored set of entries between the minimum entry and the maximum entry from the memory.

In some embodiments, the recurring payment may be a payment for an item type. Each of the plurality of entries may include data describing an item of the item type. The generating of at least one of the scores for the minimum entry, the maximum entry, and at least one of the scored set of entries may include applying the at least one analytical model to a price of the at least one item of the at least one of the minimum entry, the maximum entry, and at least one of the scored set of entries.

In some embodiments, the recurring payment may be a payment for an item type. Each of the plurality of entries may include data describing an item of the item type. The generating of at least one of the scores for the minimum entry, the maximum entry, and at least one of the scored set of entries may include applying the at least one analytical model to a quality of the at least one item of the at least one of the minimum entry, the maximum entry, and at least one of the scored set of entries.

In some embodiments, performing the plurality of binary searches may include selecting a first entry ordered in approximately a center of the data set and generating the score for the selected first entry. Performing the plurality of binary searches may include iteratively selecting additional entries ordered in approximately a center point between a previously selected entry and a boundary of the data set and generating the score for the selected additional entry until the generated score corresponds with the minimum value. The previously selected entry may be the first entry in a first iteration.

In some embodiments, performing the plurality of binary searches may include selecting a first entry ordered in approximately a center of the data set and generating the score for the selected first entry. Performing the plurality of binary searches may include iteratively selecting additional entries ordered in approximately a center point between a previously selected entry and a boundary of the data set and generating the score for the selected additional entry until the generated score corresponds with the maximum value. The previously selected entry may be the first entry in a first iteration.

DETAILED DESCRIPTION OF SEVERAL EMBODIMENTS

Systems and methods described herein may improve search processing to return results faster and improve computational efficiency for obtaining results. The systems and methods described herein may streamline processing such that relatively few brute force processes may be performed to arrive at a focused and accurate result.

Figure 1:
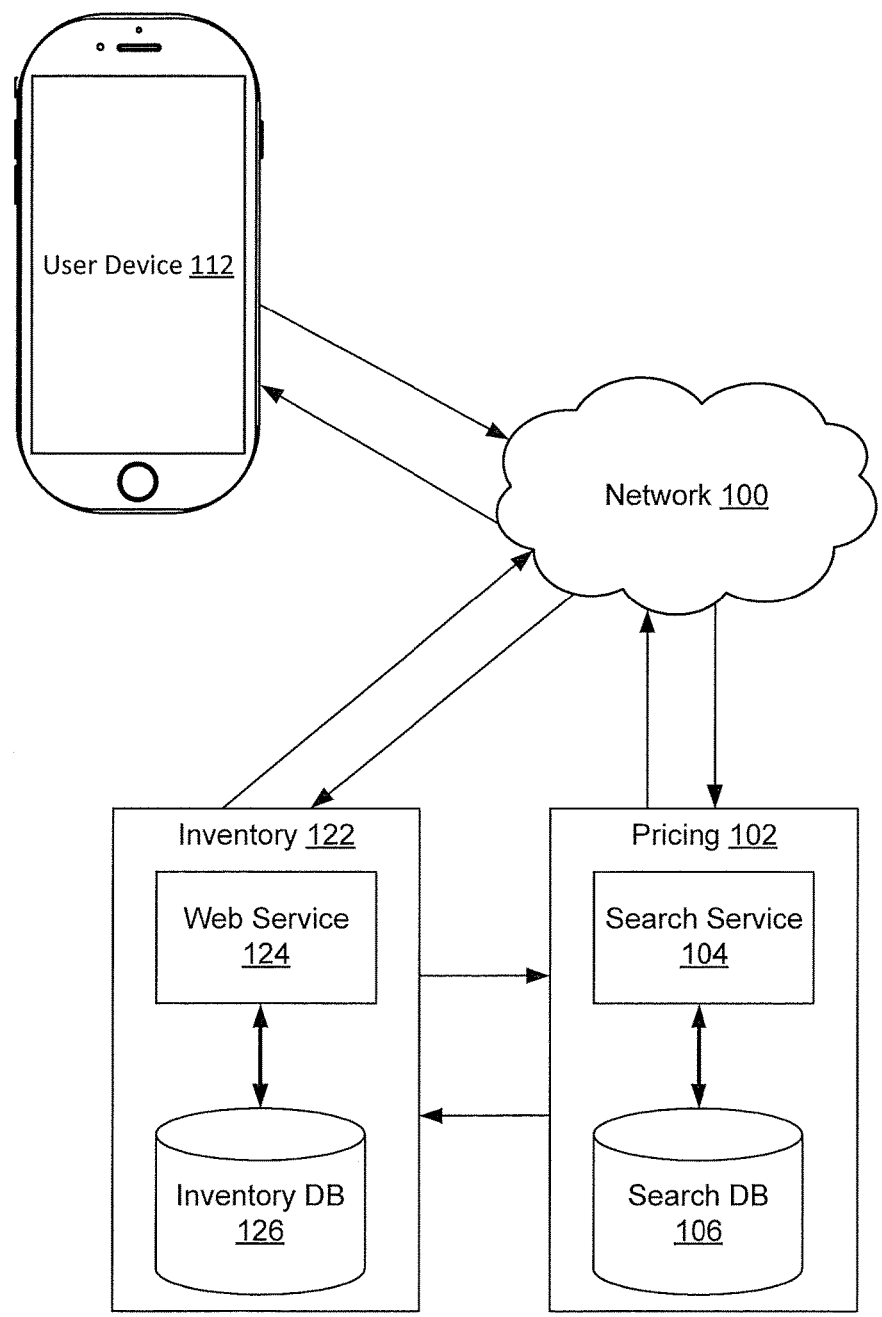
FIG. 1 shows a network according to an embodiment of the present disclosure.

FIG. 1 shows a network 100 including a pricing server 102, user device 112, and inventory server 122 according to an embodiment of the present disclosure. Network 100 may be the Internet and/or other public or private networks or combinations thereof. User device 112 may communicate search requests to pricing server 102 through network 100, and pricing server 102 may return search results to user device 112 through network 100. For example, a search request may ask pricing server 102 to find a specific item for sale or type of item for sale and/or may include data useful for identifying a transaction structure (e.g., a price for the item and/or loan terms for the item). For example, disclosed embodiments may be configured to identify and isolate assets passing a credit review for multiple tiers of customers with varying tiers of credit risk based on an intersection of affordability, credit worthiness, and/or availability of assets.

For ease of discussion, the present disclosure may describe embodiments in the context of a financial service provider predicting an optimal set of vehicle loan offers in response to receiving a loan application. For the example of an automobile loan the optimal set of loans may be determined by the monthly budget constraint of the borrower, thereby restricting the vehicles to purchase within a range of monthly payment options such as $200-$250. Another example of an optimal loan may be a loan term of 72 months with a purchase price less than $25,000 and a monthly payment less than $300. However, the disclosed embodiments are not limited to vehicle loans, home loans, land loans, personal loans, lines of credit, etc. Rather, the disclosed systems and methods may be employed to respond to any type of negotiation involving variable terms. Indeed, disclosed embodiments are not limited to the financial service industry and, in fact, are not limited to any particular industry or field.

Pricing server 102 may be configured to process search requests and return search results. Pricing server 102 may include search service 104, which may be configured to process search requests from user device 112, and search database 106, which may be configured to store previously-generated results and/or search processing rules as described in detail below. For example, search service 104 may be configured to receive a transaction proposal including a proposed transaction structure (e.g., a loan application proposing a set of terms), identify parameters of the proposed transaction structure (e.g., a loan amount, cash down required, annual percentage rate (APR), length of loan, warranty costs, etc.), and/or identify and/or rank acceptable assets meeting the parameters of the proposed transaction structure (e.g., vehicles available for sale that may be acquired under the terms of the proposed transaction).

In some embodiments, search database 106 may include some or all of the data to be searched by search service 104 in response to a search request. In some embodiments, search service 104 may search one or more external data sources. For example, external data sources may include one or more inventory servers 122. An inventory server 122 may include a web service 124 that may be configured to serve data to other computers (e.g., in response to search requests from search service 104) and/or inventory database 126 that may include data such as data describing items, item prices, and/or information related to item transaction terms. For example, the data may include vehicle inventory information of one or more automotive dealers and/or credit information associated with individuals collected and/or generated by a credit bureau. In some embodiments, web service 124 may serve as a first-level filter by providing only those assets that are responsive to the search request. For example, web service 124 may identify assets within a particular distance from a desired location (e.g., by postal zip code) and at or below a maximum sales price, thereby reducing and identifying a smaller subset of assets for processing by search service 104.

Pricing server 102, user device 112, and inventory server 122 are each depicted as single devices for ease of illustration, but those of ordinary skill in the art will appreciate that pricing server 102, user device 112, and/or inventory server 122 may be embodied in different forms for different implementations. For example, server device 102 may include a plurality of servers, a plurality of user devices 112 may communicate with server device 102, and/or a plurality of inventory servers 122 may supply data to search service 104.

Figure 2:
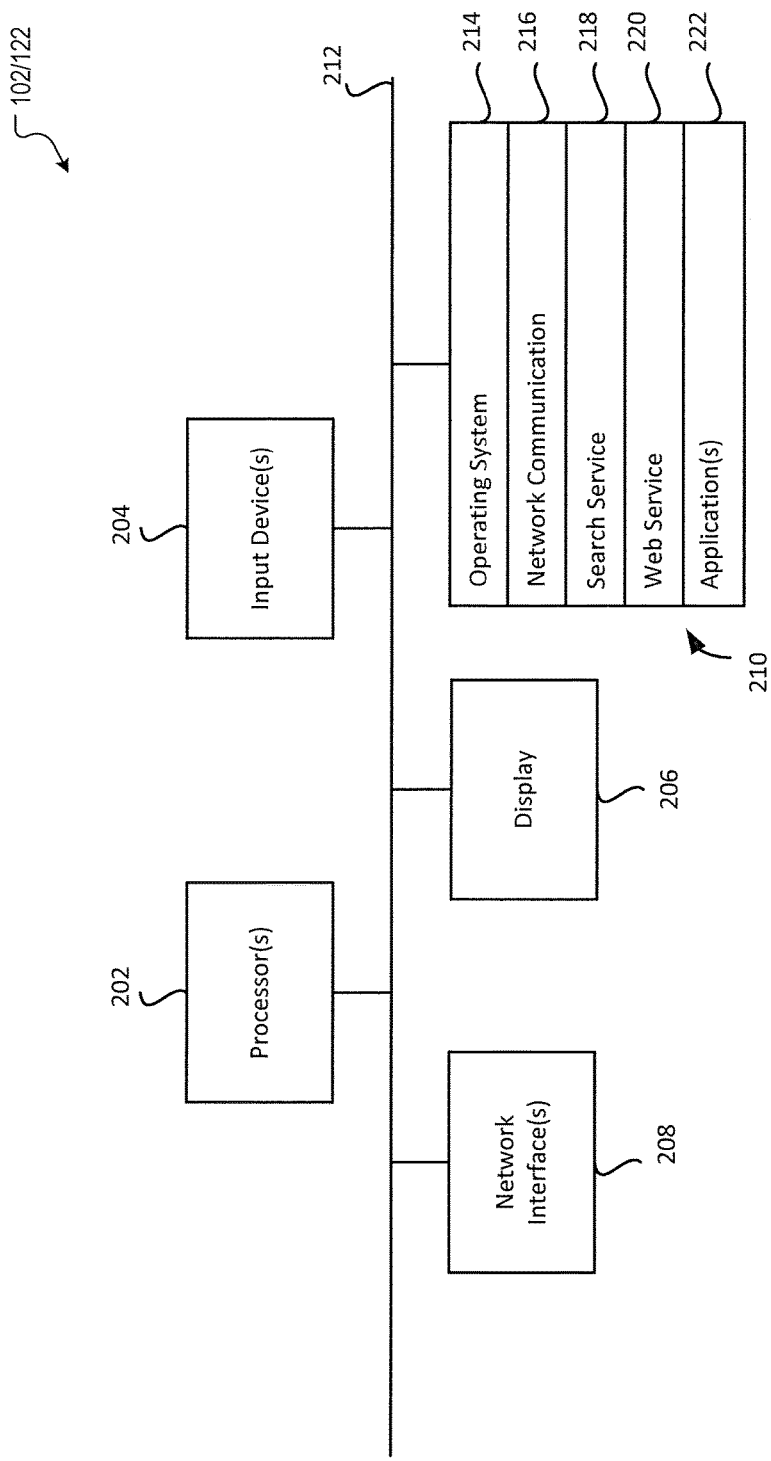
FIG. 2 shows a server device according to an embodiment of the present disclosure.

FIG. 2 is a block diagram of an example server device 102/122 that may implement various features and processes as described herein. The device of FIG. 2 may serve as pricing server 102 and/or inventory server 122, for example. The server device 102/122 may be implemented on any electronic device that runs software applications derived from compiled instructions, including without limitation personal computers, servers, smart phones, media players, electronic tablets, game consoles, email devices, etc. In some implementations, the server device 102/122 may include one or more processors 202, one or more input devices 204, one or more display devices 206, one or more network interfaces 208, and one or more computer-readable mediums 210. Each of these components may be coupled by bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Search service instructions 218 may include instructions that perform search processing as described herein. For example, search service instructions 218 may perform binary searches, perform scoring, and/or perform other processing as described herein. Web service instructions 220 may include instructions that perform data gathering processing as described herein. For example, web service instructions may include instructions that gather data to be searched and/or perform other processing as described herein.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
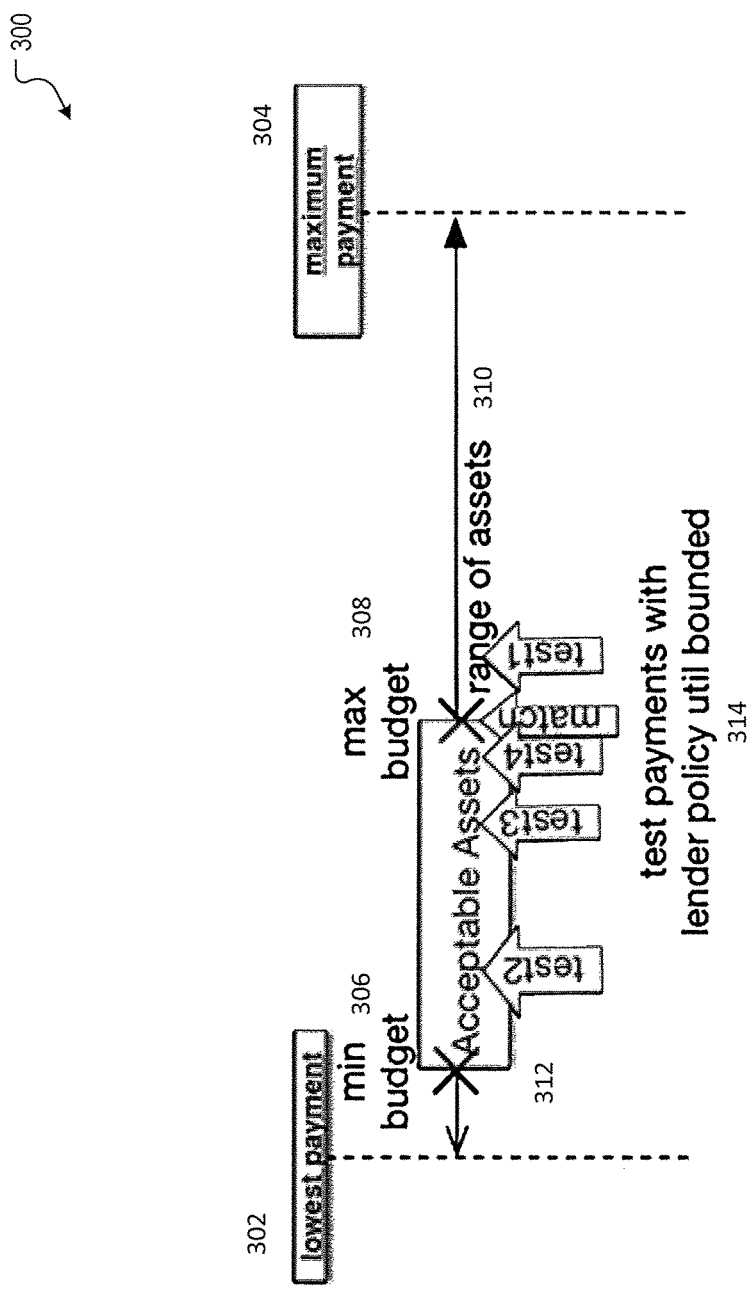
FIG. 3 shows a dataset according to an embodiment of the present disclosure.

FIG. 3 shows a dataset 300 according to an embodiment of the present disclosure. Search service 104 may be configured to generate an ordered set of assets by relative payment terms, for example in response to a request from user device 112. In some embodiments, web service 124 may generate the ordered set of assets in response to a request from search service 104. For an automobile or home, the payment terms may be for a monthly payment. The relative ordering for an asset monthly payment may be a function referred to herein as the payment score function. Using this payment score, search service 104 and/or web service 124 may identify a borrower's budget range by binary searching a relatively ordered list of asset scores. For embodiments wherein web service 124 generates the ordered set, web service 124 may take updates to inventory in inventory database 126 as the source of truth (e.g., as assets are sold or retired they may be removed from inventory database 126 in real time). For embodiments wherein search service 104 generates the ordered set, search service 104 may be synchronized with inventory database 126 or otherwise may be configured to exclude removed inventory.

In the problem space of an ordered list, search service 104 and/or web service 124 may execute a binary search to quickly identify a price point for payments at the edge of a borrower's budget constraints, thereby providing the range of monthly payments available by lender policy and risk profile to the borrower. Search service 104 and/or web service 124 may retrieve the number of assets from inventory database 126 to determine the boundaries for a binary search. Search service 104 and/or web service 124 may iteratively request details of the assets using simple index ordering to test the assets' applicability to the borrowers search terms, for example. In some embodiments, this process may be enhanced through caching of previous similar results in search database 106 and/or inventory database 126 and/or requesting a spectrum of coarse grain samples at mid points of available data such that the transactions between search service 104 and/or web service 124 may be minimized. For example, search service 104 may request a set of 50 equally divided testing points from web service 124, and these testing points may be are used in one or two passes of the binary search algorithm described herein, thereby limiting the interaction transaction count between search service 104 and/or web service 124 to fewer than requesting every test point individually.

For example, dataset 300 of FIG. 3 may include an asset having a lowest payment 302 among the assets and an asset having a maximum payment 304 among the assets. Lowest payment 302 and maximum payment 304 may form the upper and lower bounds of the range of assets 310, respectively. Within those bounds, each asset may be ordered by payment score (e.g., by monthly payment from lowest payment 302 to maximum payment 304). A search request from user device 112 may define a minimum budget 306 and a maximum budget 308 (e.g., a lowest monthly payment and a highest monthly payment in which the user is interested, respectively). Assets with payments between the minimum budget 306 and maximum budget 308 may be acceptable assets 312. Search service 104 may perform one or more binary searches for test payments 314 within the range of assets 310 to identify an asset matching the minimum budget 306 and an asset matching the maximum budget 308. The matching assets may define the edges of the acceptable assets 312, and assets in the range of assets 310 that is ordered between these edges may be regarded as acceptable assets 312. For example, given an asset list of 4 million assets, a binary search may isolate the maximum budget constraint within 4 assets in only 20 test samples.

The payment score may be based on an actual annual percentage rate (APR) or monthly payment. However, in some embodiments, the payment score may not have to be exact or even close to an actual APR or monthly payment, as long as the payment score relatively orders approximate APR and monthly payment. This approximation may be relative to other assets and may provide a scale of values that can be ordered and sorted from 1 to N to determine the relative pricing one would get for APR and monthly payment of the asset under financing. For example, components affecting APR and/or monthly payment may be understood in order to generate approximations (e.g., quality of item (age, make, model, options, etc.) may affect APR strongly, sales price may affect monthly payment strongly, etc.).

For example, an embodiment of the payment score function may be expressed as follows:

$$F(A)=PV+[(Q*QC)+(Q2*QC2)\ldots+(QN*QCN)];$$

where F(A)=the relative approximate weight of the financing for the asset; A=the assent to be financed; PV=the present value of the asset to be financed; Q=any quality metric such as age or useful remaining life of the asset; QC=a sloping coefficient of the quality metric; and Q2 to QN and QC2 to QCN are additional quality metrics applicable to relative payments. Based on the art of linear expression fitting, this function may be created using existing and historical APR, payment, and asset data, for example.

In a specific example, the payment score function may be applied to an automobile loan as follows:

$$F(A)=PV+(M*MC)+(Y*YC)+(PV/ATF*LTVC);$$

where A=the automobile to estimate; PV=present value of the automobile; M=miles on the odometer of the vehicle; MC=1/1000 assuming every 1,000 miles on a vehicle increases APR; Y=number of months since the vehicle was manufactured; YC=10, assuming age of vehicle decreases value and increases APR; ATF=the amount to finance that can be the same as PV or less (this may assume the loan to value ratio will increase APR and risk of lender); and LTVC=loan to value coefficient of 100.

For the automobile example, the quality of the asset may be estimated using the age of the vehicle and the mileage and loan to value ratio. Where known in the art of data science, linear regression, and/or boosted tree approximation algorithms, an appropriate model or function may be fitted to the approximation APR of the asset based on the present value and quality of the asset and/or historical records of assets as presented to a nominal customer. For example, for the fitting algorithm a function may be derived from historical data or real asset lending tables. The duration of the scoring for the assets may be longer than the transaction between user device 112 and search service 104, because this approximation may be done once for every user device 112, whereas the pricing may be done per user. For example, the scoring may be done in a batch periodically (e.g., nightly) and/or incrementally as assets are added to inventory database 126.

Referring to Table 1 below, the formula applied shows the Honda Accord (#1) has the lowest monthly payment based on low miles and low age. The second Honda Civic (#3) has a lower monthly payment than the first Honda Civic (#2) due to the lower miles and less amount to finance.

A1=Honda Accord, 10K miles, PV=$20K, ATF=$20K, Y=1

A2=Honda Civic, 50K miles, PV=$20K, ATF=$19K, Y=12

A3=Honda Civic 2, 30K miles, PV=$20K, ATF=$18K, Y=12

TABLE 1

| Asset | PV | ATF | Months Old | Mileage | F(A) |
|---|---|---|---|---|---|
| Honda Accord | 20000 | 20000 | 1 | 10000 | 20120 |
| Honda Civic | 20000 | 19000 | 12 | 50000 | 20275.26316 |
| Honda Civic 2 | 20000 | 18000 | 12 | 30000 | 20261.11111 |

Figure 4:
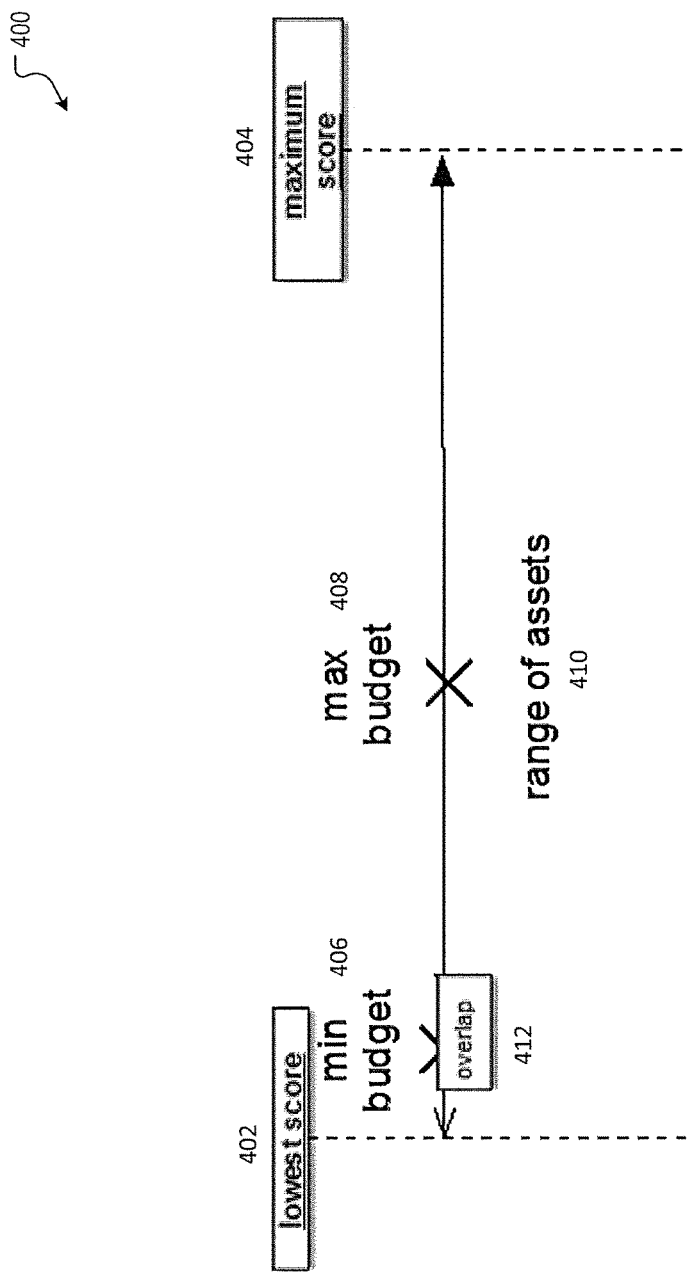
FIG. 4 shows a search result according to an embodiment of the present disclosure.

FIG. 4 shows a search result 400 according to an embodiment of the present disclosure. Search service 104 may generate search result 400 in response to a search query from user device 112 specifying a minimum budget 406 and maximum budget 408. Search service 104 may search the range of assets 410 between the lowest scored asset 402 and maximum scored asset 404 to identify acceptable assets 412, where acceptable assets 412 may be those that match the terms of the desired loan and/or monthly payment. Search service 104 may apply a search function to find assets scored in the range of assets 410 according to the payment score function described above, for example. The search function may receive user search parameters and may generate results that meet those parameters. The results may be based on previously-processed payment score function results (e.g., generated from prior searches and stored in search database 106) and/or may be generated in response to the request by applying the payment score function described above. The payment score may be pre-processed across the entire set of assets in a class such that the score may be stored and available prior to the user's request for acceptable assets.

In some embodiments, search service 104 may apply filtering to the range of assets 410 prior to execution of the search function and/or after the search function has identified budget boundary points. For example, the search query may define one or more features that should be included in a matching asset and/or that should be excluded from a matching asset. Returning to the automobile example, the search query may indicate that any results should be limited to cars of specified make, model, and/or year, cars having one or more specified options, cars having fewer than a specified number of miles, etc. Filtering may eliminate items from the full range of assets 410 when applied before searching and/or may limit results after the range of assets are identified by monthly payment when applied after searching.

As shown in FIG. 4, for the lower or upper limits of the range of results, the endpoint for returning results for display may overlap the boundary (e.g., the minimum budget 406 and/or maximum budget 408) by a factor. For example, the minimum budget 406 may appear at point X in the range of assets 410, but search service 104 may price out PTM(X−1000) to PMT(x+1000) items to assure that the starting point and overlap of swaps in and out of policy are accounted for in the assets presented to the borrower. Swaps in and out of policy may occur as assets are associated with a person's credit policy. For example, assets may not be applicable to certain customer segments due to their overall price or terms of the loan requested. Swaps may also occur as policy is not always linear and there may be gaps or spikes where APRs fluctuate in certain situations. As part of the query and/or after results are generated, the user may specify an order of results to be shown (e.g. lowest payment first). Based on this order, the overlap may identify the assets at the beginning of the sort order to be presented first. FIG. 4 shows an example where lowest payment is shown first, but it may be understood that for a reverse sort order, search service 104 may work from maximum to lowest score instead of lowest to maximum.

Once the overlap has been priced to monthly payment, PMT(X), search service 104 may identify the lower range and calculate only the asset payments within that range or a subset thereof. The overlap may allow for identification of assets which fall slightly above or below the predicted pricing score for the assets, thereby making a more inclusive search of potentially acceptable assets. For example, search service 104 may provide results for display by user device 112 in the form of a web page, where the number of assets on the page may be few depending on display real estate available. For example, in some embodiments, a number of entries showing the assets and monthly payments may be on the order of 10-50 entries per page. Thus, search service 104 may only process 10 to 50 assets fully for payment, PMT (X). Search service 104 may use any appropriate processing to calculate payments. For example, payments may be calculated as taught in US Patent Application Publication No. 2017/0178063, entitled "Automated Systems for Reducing Computational Loads in The Mass Execution of Analytical Models Using Scale-Out Computing," which is incorporated by reference herein in its entirety.

The overlap may be sufficient enough that it provides enough post filtered assets to satisfy the page view requirements (10-50 assets) of the page. The overlap may be sufficient to identify swaps in the asset classes that may occur by in a tightly packed score range. After search service 104 prices out the overlap to payment, PMT(X−1000) to PMT(X+1000), search service 104 may further filter these assets by payment or other characteristics discovered during the PMT calculation. Search service 104 may continue generating the display along the list of acceptable assets 412 in the sort order, ascending or descending payment, based on customer preferences. The number of pages of assets may be estimated based on the filtered set of assets on the first page and number of assets in the budget range. For example, if 50% of the first 1000 assets searched are in policy and in-budget, and search service 104 has identified 100,000 assets, the overall number of pages to be requested may be given as 100,000*50%/page size, or 50,000/50=1000 pages. As known to those skilled in the art of web page design, this number may be dynamically updated to reflect a more exact count as more asset pages are shown to the user.

Figure 5:
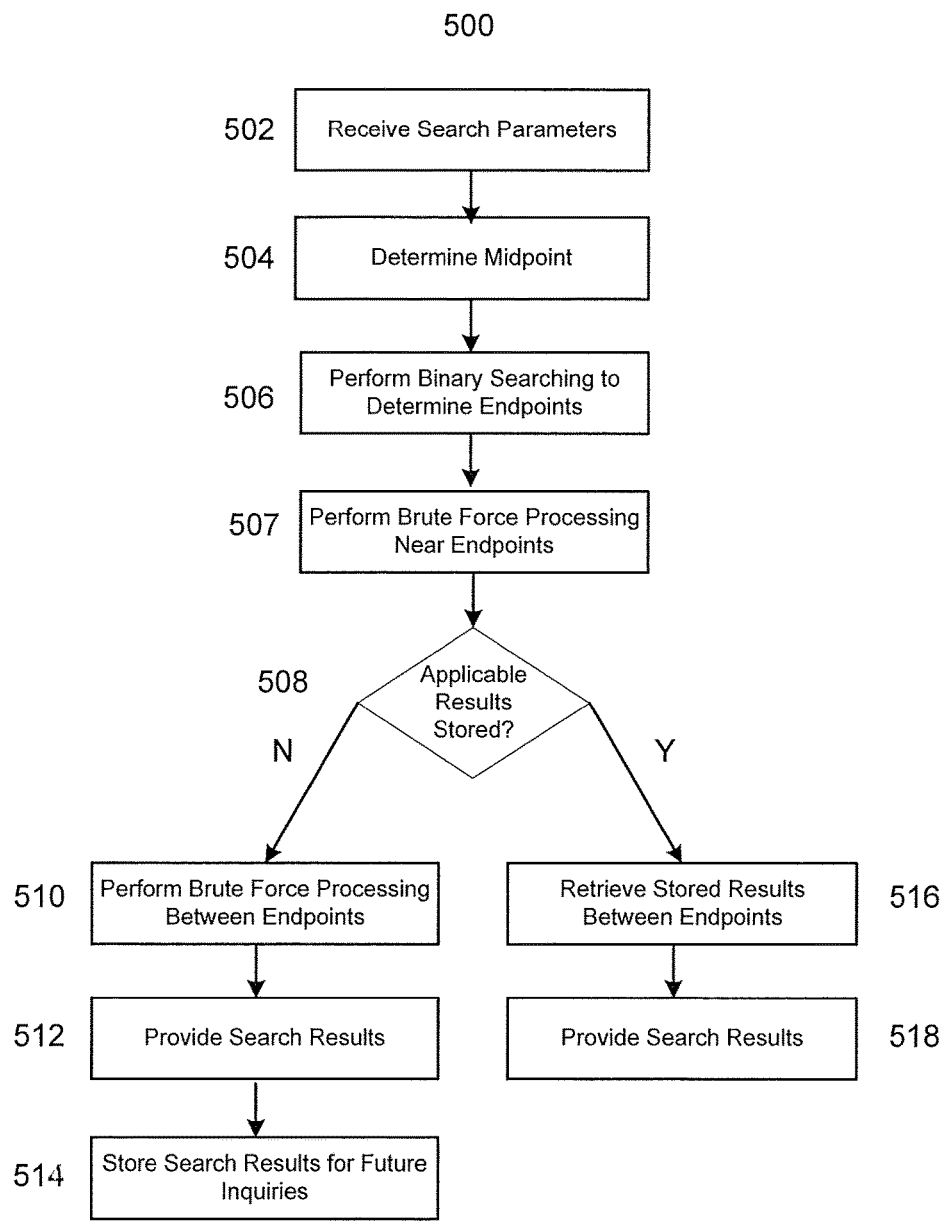
FIG. 5 shows a search process according to an embodiment of the present disclosure.

FIG. 5 shows a search process 500 according to an embodiment of the present disclosure. Pricing server 102 may perform process 500 to generate results responsive to a search inquiry from user device 112, for example. The results may include one or more assets meeting the user's search requirements and being deemed available to the user by one or more lenders, for example.

At 502, pricing server 102 may receive search parameters. For example, user device 112 may send a search request to pricing server 102 (e.g., through a web form, online app, or other network communication facilitator). Search service 104 may process the search request to identify one or more characteristics defining the scope of the search. The characteristics may include characteristics of the vehicle or item to be purchased, as noted above, and/or characteristics describing the user that may be used to indicate a creditworthiness of the user applicant (or other applicant whose information is being entered by the user).

In some embodiments, only the characteristics of the vehicle or item may be required to perform the remaining processing of process 500. For example, the algorithm for F(A) given above may be borrower-agnostic (e.g., it may apply to any user). Accordingly, search service 104 may not use, and may not even gather, user data to process search requests when using this algorithm or other borrower-agnostic algorithms.

In other embodiments, search service 104 may take user characteristics into account. For example, search service 104 may extract identifying information for a loan applicant from the request (e.g., name, address, employers, social security number, driver's license number, financial account number, etc.) and acquire a credit rating for the applicant from a credit bureau, account balance of the applicant from financial service providers, income information from an employer of the applicant, etc. Based on the item characteristics and applicant characteristics, search service 104 may identify a minimum budget and maximum budget for the search.

At 504, pricing server 102 may determine a midpoint of the range of assets to use as a starting point for the search of the assets. For example, search service 104 may select an asset that is halfway between the lowest scoring asset and the highest scoring asset in the range of assets. The selected asset may be halfway in terms of count (e.g., if there are 100,000 assets, search service 104 may select the asset that is in the 50,000$^{th}$ position of the range). The selected asset may be halfway in terms of score. In other embodiments, the midpoint asset may be selected arbitrarily, randomly, or according to some other logic. In determining the midpoint, pricing server 102 may consider a reduced asset set based on customer preference selection such as closest to a zip code radius, color, or preferred features, thereby filtering and reducing the overall number of assets in the range.

At 506, pricing server 102 may perform binary searching to identify assets at the endpoints (e.g., the minimum budget and maximum budget) for the search. For example, search service 104 may check search database 106 for a previously-calculated score for the midpoint asset within a recent period of time (e.g., within the past day, or week, or other predetermined time period, depending on embodiment). If search service 104 does not find a previously-calculated score for the midpoint asset, search service 104 may perform a brute force calculation using the payment score function (or some other scoring function in other embodiments) on the selected midpoint asset.

Once the calculation result is retrieved from search database 106, or once the calculation is complete if freshly processed, search service 104 may compare the calculation result for the midpoint asset to the minimum budget and/or maximum budget.

For example, search service 104 may determine whether the midpoint asset is less than or greater than the minimum budget. If the midpoint asset is less than the minimum budget, search service 104 may set a new midpoint that is midway between the previous midpoint asset and the highest scoring asset in the range of assets. If the midpoint asset is greater than the minimum budget, search service 104 may set a new midpoint that is midway between the previous midpoint asset and the lowest scoring asset in the range of assets. Search service 104 may repeat the binary search, calculating or retrieving a score for the new midpoint and comparing it with the minimum budget, until the selected midpoint is the same as the minimum budget or is within a predetermined margin of the minimum budget (e.g., is less than a predefined amount of money from the minimum budget).

Search service 104 may also determine whether the midpoint asset is less than or greater than the maximum budget. If the midpoint asset is less than the maximum budget, search service 104 may set a new midpoint that is midway between the previous midpoint asset and the highest scoring asset in the range of assets. If the midpoint asset is greater than the maximum budget, search service 104 may set a new midpoint that is midway between the previous midpoint asset and the lowest scoring asset in the range of assets. Search service 104 may repeat the binary search, calculating or retrieving a score for the new midpoint and comparing it with the maximum budget, until the selected midpoint is the same as the maximum budget or is within a predetermined margin of the maximum budget (e.g., is less than a predefined amount of money from the maximum budget).

Search service 104 may perform the binary searching to find assets matching the minimum budget and the maximum budget in any order and/or simultaneously. In any case, it can be clearly understood that the amount of brute force processing using the payment score function may be substantially limited through the processing of step 506. Search service 104 may not need to calculate a payment score for every entry in the range of assets to identify the assets matching the minimum budget and the maximum budget, but only on a handful of selected midpoint assets.

At 507, pricing server 102 may perform brute force pricing calculations for a range of assets +/− a predetermined number (e.g. +/−1000) around each endpoint. This brute force pricing may determine exact minimums and maximums and may eliminate swaps in the asset ranges per policy.

At 508, pricing server 102 may determine whether there are previously-calculated results available. For example, search service 104 may check search database 106 to determine whether there are any previously-calculated scores for the assets between the identified assets matching the minimum budget and the maximum budget. For example, search service 104 may check search database 106 for previously-calculated scores for the assets between the identified assets within a recent period of time (e.g., within the past day, or week, or other predetermined time period, depending on embodiment).

At 510, pricing server 102 may perform brute force paging if search service 104 failed to find a previously-calculated score for at least one of the assets between the identified assets. For example, for any assets between the identified assets for which search service 104 did not find a previously-calculated score, search service 104 may perform a brute force calculation using the payment score function (or some other scoring function in other embodiments such as lookup tables or iterative multiple variable based logic). Note that even if brute force processing is required for each asset between the identified assets, the amount of brute force processing required may be substantially less than in embodiments wherein brute force processing is performed for all assets within the range of assets or for the assets presented on a current page to the user, for example 10-50 assets per screen page. Accordingly, results may be returned substantially faster than in embodiments wherein brute force processing is performed for all assets within the range of assets.

At 512, pricing server 102 may provide the results of the processing at 510 as search results responsive to the user request. If brute force processing is required for each asset between the identified assets, search service 104 may skip 516-518 (described below), and search service 104 may provide the results to user device 112. If brute force processing is not required for each asset between the identified assets, search service 104 may perform 516-518 (described below), and search service 104 may add the results identified through the brute force processing to the results identified at 516.

At 514, pricing server 102 may store the search results generated at 510 in search database 106 for future inquiries. Accordingly, if process 500 is performed again in response to a search request for the same user, search service 104 may use the stored results and omit brute force processing for these results (e.g., search service 104 may obtain the results at 516 as described below).

At 516, pricing server 102 may retrieve previously-calculated score(s) from search database 106 if search service 104 found a previously-calculated score for at least one of the assets between the identified assets. If all of the assets between the identified assets have scores stored in search database 106, search service 104 may skip 510-514 (described above).

At 518, pricing server 102 may provide the results of the processing at 516 as search results responsive to the user request. If all of the assets between the identified assets have scores stored in search database 106, search service 104 may skip 510-514 (described above), and search service 104 may provide the results to user device 112. If brute force processing is required for at least one asset between the identified assets, search service 104 may perform 516-518 (described below), and search service 104 may add the results identified in search database 106 to the results identified at 510.

In some embodiments, pricing server 102 may perform 508-518 for each page of results separately. As noted above, for situations where a large number of results are obtained, user device 112 may display the results in a paginated fashion, with a subset of results (e.g., 10-50 entries) per page. User device 112 may request the results on a page-by-page basis, and pricing server 102 may perform 508-518 in response to each request from user device 112 for a new page. This may reduce the number of brute force calculations performed per page load, which may further speed presentation of results. In other embodiments, pricing server 102 may perform 508-518 for all results at once, which may cause more of a delay for the initial page load but make subsequent page loads even faster than in the embodiments where pricing server 102 performs 508-518 for each page of results separately. Note that in either case, the results may be returned substantially faster, and with substantially less processing, than in embodiments wherein brute force processing is performed for all assets within the range of assets.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of searching data stored in computer-readable media, the method comprising:
receiving, at a processor, a request from a user interface to perform a search of a data set comprising a plurality of entries, the request defining a minimum value and a maximum value for a recurring payment;
performing, by the processor, a plurality of binary searches of the data set to identify a minimum entry and a maximum entry, each binary search comprising selecting a single entry and using at least one analytical model to generate a score for the single entry, wherein the score of the minimum entry corresponds with the minimum value and the score of the maximum entry corresponds with the maximum value, and wherein the at least one analytical model is configured to evaluate at least one factor contributing to a recurring payment value;
identifying, by the processor, a set of entries between the minimum entry and the maximum entry;
using the at least one analytical model to generate, by the processor, a score for each of the set of entries between the minimum entry and the maximum entry while ignoring entries outside of the set of entries between the minimum entry and the maximum entry;
identifying, by the processor, at least one of the minimum entry, the maximum entry, and at least one of the scored set of entries between the minimum entry and the maximum entry as a responsive entry based on the respective scores of each of the at least one of the minimum entry, the maximum entry, and at least one of the scored set of entries between the minimum entry and the maximum entry;
returning, by the processor, information describing the at least one responsive entry as a response to the request, the information including a recurring payment value for the at least one responsive entry; and
causing, by the processor, the information describing the at least one responsive entry to be displayed in the user interface.

2. The method of claim 1, further comprising storing, by the processor, the respective scores of each of the at least one of the minimum entry, the maximum entry, and at least one of the scored set of entries between the minimum entry and the maximum entry in a memory in communication with the processor.

3. The method of claim 1, wherein the generating of at least one of the scores for the minimum entry, the maximum entry, and at least one of the set plurality of entries comprises retrieving a previously determined score of at least one of the minimum entry, the maximum entry, and at least one of the scored set of entries between the minimum entry and the maximum entry from a memory in communication with the processor.

4. The method of claim 1, wherein:
the recurring payment is a payment for an item type; and
each of the plurality of entries includes data describing an item of the item type.

5. The method of claim 4, wherein the generating of at least one of the scores for the minimum entry, the maximum entry, and at least one of the scored set of entries comprises applying the at least one analytical model to a quality and/or a price of the at least one item of the at least one of the minimum entry, the maximum entry, and at least one of the scored set of entries.

6. The method of claim 1, wherein the at least one analytical model includes the following payment score function: $F(A)=PV+[(Q*QC)+(Q2*QC2) \ldots +(QN*QCN)]$, wherein:
$F(A)$=a relative approximate weight of financing for an asset;
$A$=the asset to be financed;
$PV$=a present value of the asset to be financed;
$Q$=a quality metric of the asset;
$QC$=a sloping coefficient of the quality metric; and
$Q2$ to $QN$ and $QC2$ to $QCN$ are additional quality metrics applicable to relative payments.

7. The method of claim 1, wherein performing the plurality of binary searches comprises:
selecting a first entry ordered in a center of the data set and generating the score for the selected first entry; and iteratively selecting additional entries ordered in a center point between a previously selected entry and a boundary of the data set and generating the score for the selected additional entry until the generated score corresponds with the minimum value, wherein the previously selected entry is the first entry in a first iteration.

8. The method of claim 1, wherein performing the plurality of binary searches comprises:
selecting a first entry ordered in a center of the data set and generating the score for the selected first entry; and
iteratively selecting additional entries ordered in a center point between a previously selected entry and a boundary of the data set and generating the score for the selected additional entry until the generated score corresponds with the maximum value, wherein the previously selected entry is the first entry in a first iteration.

9. A method of responding to search requests using pre-analyzed data, the method comprising:
identifying, by a processor, a set of entries of a data set comprising a plurality of entries, the set of entries being ordered between a minimum entry and a maximum entry;
using at least one analytical model to generate, by the processor, a score for each of the set of entries between the minimum entry and the maximum entry while ignoring entries outside of the plurality of entries between the minimum entry and the maximum entry, wherein the at least one analytical model is configured to evaluate at least one factor contributing to a recurring payment value;
storing, by the processor, each score in a memory in communication with the processor;
receiving, at the processor, a request from a user interface to perform a search of the data set, the request defining a minimum value and a maximum value for a recurring payment;
identifying, by the processor, at least a subset of the set of entries having scores between the minimum value and the maximum value;
returning, by the processor, the information describing at least the subset of the set of entries as at least a portion of the response to the request, the information including respective recurring payment values for each entry in the at least the subset of the set of entries; and,
causing, by the processor, the information describing the at least the subset of the set of entries to be displayed in the user interface.

10. The method of claim 9, further comprising:
performing, by the processor, a plurality of binary searches to identify an upper bound and a lower bound for at least one responsive entry outside of the set of entries and between the minimum value and the maximum value, each binary search comprising selecting a single entry and using the at least one analytical model to generate a score for the single entry;
identifying, by the processor, a set of entries between the upper bound and a lower bound;
using the at least one analytical model to generate, by the processor, a score for each of the set of entries between the upper bound and the lower bound while ignoring entries outside of the set of entries between the upper bound and a lower bound;
identifying, by the processor, at least one of the set of entries between the upper bound and the lower bound as a responsive entry based on the respective scores of each of the scored set of entries between the upper bound and the lower bound; and returning, by the processor, the at least one responsive entry as an additional portion of the response to the request.

11. The method of claim 10, further comprising storing, by the processor, the respective scores of each of the set of entries between the upper bound and the lower bound in the memory in communication with the processor.

12. The method of claim 10, wherein performing the plurality of binary searches comprises:
selecting a first entry ordered in a center of the data set and generating the score for the selected first entry; and
iteratively selecting additional entries ordered in a center point between a previously selected entry and a boundary of the data set and generating the score for the selected additional entry until the generated score corresponds with the lower bound, wherein the previously selected entry is the first entry in a first iteration.

13. The method of claim 10, wherein performing the plurality of binary searches comprises:
selecting a first entry ordered in a center of the data set and generating the score for the selected first entry; and
iteratively selecting additional entries ordered in a center point between a previously selected entry and a boundary of the data set and generating the score for the selected additional entry until the generated score corresponds with the upper bound, wherein the previously selected entry is the first entry in a first iteration.

14. A system for searching data stored in computer-readable media, comprising:
a processor;
a user interface component in communication with the processor and configured to receive a request to perform a search of a data set comprising a plurality of entries, the request defining a minimum value and a maximum value for a recurring payment; and
a non-transitory memory in communication with the processor comprising instructions that, when executed by the processor, cause the processor to perform processing comprising:
performing a plurality of binary searches of the data set to identify a minimum entry and a maximum entry, each binary search comprising selecting a single entry and using at least one analytical model to generate a score for the single entry, wherein the score of the minimum entry corresponds with the minimum value and the score of the maximum entry corresponds with the maximum value, and wherein the at least one analytical model is configured to evaluate at least one factor contributing to a recurring payment value;
identifying a set of entries between the minimum entry and the maximum entry;
using the at least one analytical model to generate a score for each of the set of entries between the minimum entry and the maximum entry while ignoring entries outside of the set of entries between the minimum entry and the maximum entry;
identifying at least one of the minimum entry, the maximum entry, and at least one of the scored set of entries between the minimum entry and the maximum entry as a responsive entry based on the respective scores of each of the at least one of the minimum entry, the maximum entry, and at least one of the scored set of entries between the minimum entry and the maximum entry;
returning information describing the at least one responsive entry as a response to the request, the information including a recurring payment value for the at least one responsive entry; and displaying, by the interface component, the information describing the at least one responsive entry.

15. The system of claim 14, wherein the processing further comprises storing, in the memory, the respective scores of each of the at least one of the minimum entry, the maximum entry, and at least one of the scored set of entries between the minimum entry and the maximum entry.

16. The system of claim 14, wherein the generating of at least one of the scores for the minimum entry, the maximum entry, and at least one of the set plurality of entries comprises retrieving a previously determined score of at least one of the minimum entry, the maximum entry, and at least one of the scored set of entries between the minimum entry and the maximum entry from the memory.

17. The system of claim 14, wherein:

the recurring payment is a payment for an item type;

each of the plurality of entries includes data describing an item of the item type; and the generating of at least one of the scores for the minimum entry, the maximum entry, and at least one of the scored set of entries comprises applying the at least one analytical model to a quality and/or a price of the at least one item of the at least one of the minimum entry, the maximum entry, and at least one of the scored set of entries.

18. The system of claim 14, wherein the at least one analytical model includes the following payment score function: $F(A)=PV+[(Q*QC)+(Q2*QC2) \ldots +(QN*QCN)]$, wherein:

$F(A)$=a relative approximate weight of financing for an asset $A$=the asset to be financed;

$PV$=a present value of the asset to be financed;

$Q$=a quality metric of the asset $QC$=a sloping coefficient of the quality metric; and $Q2$ to $QN$ and $QC2$ to $QCN$ are additional quality metrics applicable to relative payments.

19. The system of claim 14, wherein performing the plurality of binary searches comprises:

selecting a first entry ordered in a center of the data set and generating the score for the selected first entry; and iteratively selecting additional entries ordered in a center point between a previously selected entry and a boundary of the data set and generating the score for the selected additional entry until the generated score corresponds with the minimum value, wherein the previously selected entry is the first entry in a first iteration.

20. The system of claim 14, wherein performing the plurality of binary searches comprises:

selecting a first entry ordered in a center of the data set and generating the score for the selected first entry; and iteratively selecting additional entries ordered in a center point between a previously selected entry and a boundary of the data set and generating the score for the selected additional entry until the generated score corresponds with the maximum value, wherein the previously selected entry is the first entry in a first iteration.

* * * * *